(12) United States Patent
Bristol et al.

(10) Patent No.: US 10,194,225 B2
(45) Date of Patent: Jan. 29, 2019

(54) STRAP ARM OF HEAD-MOUNTED DISPLAY WITH INTEGRATED AUDIO PORT

(71) Applicant: Facebook Technologies, LLC, Menlo Park, CA (US)

(72) Inventors: Peter Wesley Bristol, Seattle, WA (US); Scott Andrew Dallmeyer, Seattle, WA (US); Quintin Morris, Issaquah, WA (US); Matthew James Devoe, Menlo Park, CA (US); David Tao, Santa Clara, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 15/680,086

(22) Filed: Aug. 17, 2017

(65) Prior Publication Data

US 2018/0255386 A1    Sep. 6, 2018

Related U.S. Application Data

(60) Provisional application No. 62/467,135, filed on Mar. 5, 2017.

(51) Int. Cl.
*H04R 1/02* (2006.01)
*H04R 1/28* (2006.01)

(52) U.S. Cl.
CPC ........... *H04R 1/028* (2013.01); *H04R 1/2857* (2013.01)

(58) Field of Classification Search
CPC .... H04R 1/028; H04R 1/2857; H04R 5/0335; H04R 5/033; H04R 2201/109; H04R 2460/00; H04R 2201/10; H04R 1/1066

USPC .......................................... 381/333, 334, 337
See application file for complete search history.

(56) References Cited

U.S. PATENT DOCUMENTS

| | | | |
|---|---|---|---|
| D338,339 S | 8/1993 | Anderson et al. | |
| 5,272,757 A | 12/1993 | Scofield et al. | |
| D355,229 S | 2/1995 | Mugnolo | |
| 6,369,952 B1 | 4/2002 | Rallison et al. | |
| D553,697 S | 10/2007 | Hallar | |

(Continued)

FOREIGN PATENT DOCUMENTS

CN    204925511 U    12/2015

OTHER PUBLICATIONS

PCT International Search Report and Written Opinion, PCT Application No. PCT/US2017/068817, dated Apr. 23, 2018, 19 pages.

(Continued)

*Primary Examiner* — Vivian Chin
*Assistant Examiner* — Douglas Suthers
(74) *Attorney, Agent, or Firm* — Fenwick & West LLP

(57) ABSTRACT

A head-mounted display (HMD) includes a strap arm that transmits audio. The HMD includes a front rigid body and a strap arm. The strap arm includes a body portion defining a boss having an aperture that rotatably connects the strap arm to the front rigid body. The body portion defines an audio passage to transmit sound and an audio port to output the sound. The audio passage is defined along the body portion between the aperture of the boss and the audio port. A speaker is positioned, such as within the aperture, to emit the sound through the audio passage and to the audio port. The strap arm can further include a back volume unit that enhances the sound transmitted through the audio passage.

20 Claims, 6 Drawing Sheets

(56) References Cited

U.S. PATENT DOCUMENTS

| | | |
|---|---|---|
| D650,531 S | 12/2011 | Young et al. |
| D713,049 S | 9/2014 | Shah |
| D721,373 S | 1/2015 | Logereau |
| D721,376 S | 1/2015 | Lee |
| D743,409 S | 11/2015 | Chen |
| D747,042 S | 1/2016 | Busuttil |
| D768,137 S | 10/2016 | Ju |
| D799,121 S | 10/2017 | Jacobs et al. |
| D811,729 S | 3/2018 | Bysshe |
| D812,170 S | 3/2018 | Henderson |
| 2004/0037444 A1 | 2/2004 | Redmer et al. |
| 2007/0030442 A1* | 2/2007 | Howell .................. G02C 11/10 351/158 |
| 2010/0079356 A1 | 4/2010 | Hoellwarth |
| 2011/0267748 A1 | 11/2011 | Lane et al. |
| 2014/0152034 A1 | 6/2014 | Tussy |
| 2014/0176398 A1 | 6/2014 | West et al. |
| 2014/0268016 A1* | 9/2014 | Chow .................... G02C 11/10 351/158 |
| 2016/0103339 A1* | 4/2016 | White ................... G02C 11/10 351/123 |
| 2016/0249124 A1 | 8/2016 | Drinkwater et al. |
| 2016/0363771 A1 | 12/2016 | Miller et al. |

OTHER PUBLICATIONS

European Extended Search Report, European Application No. 18151920.8, dated Jun. 5, 2018, 12 pages.

* cited by examiner

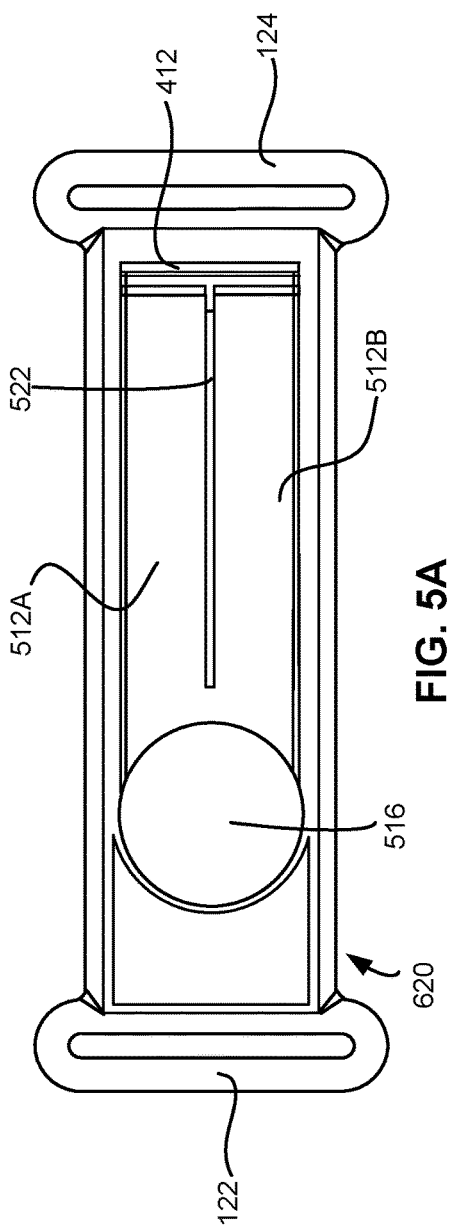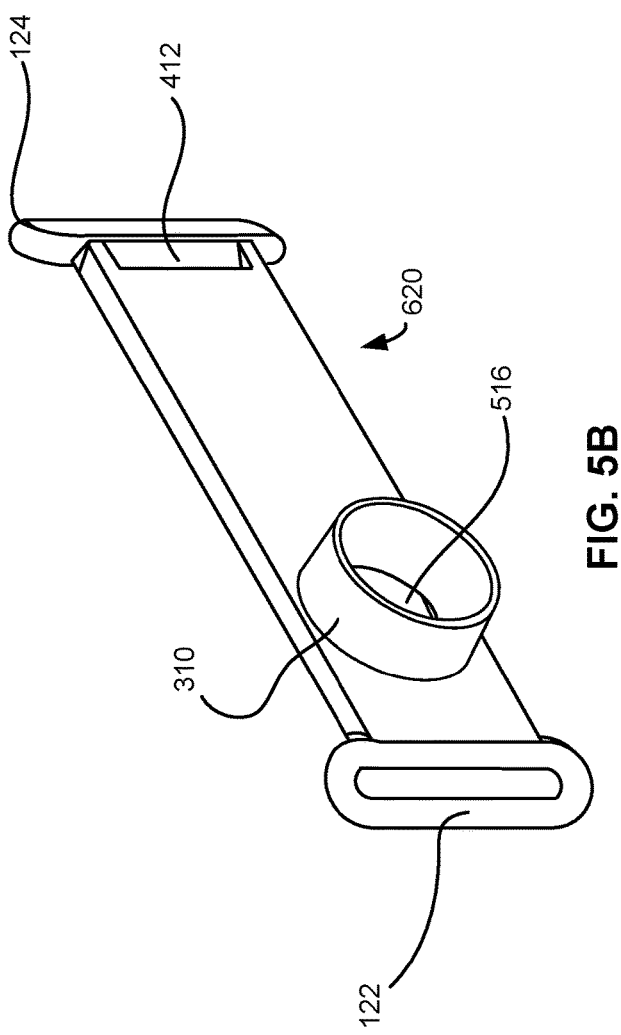
FIG. 5A
FIG. 5B

STRAP ARM OF HEAD-MOUNTED DISPLAY WITH INTEGRATED AUDIO PORT

CROSS REFERENCE TO RELATED APPLICATION

This application claims the benefit of U.S. Provisional Patent Application No. 62/467,135, filed Mar. 5, 2017, which is incorporated by reference herein in its entirety.

BACKGROUND

Field of the Disclosure

The present disclosure generally relates to a strap system for a head-mounted display, and specifically to a strap system with integrated audio ports for transmitting sound.

Description of the Related Arts

Head-mounted displays (HMDs) have wide applications in various fields, including engineering design, medical surgery practice, military simulated practice, and video gaming. For example, a user wears an HMD while playing video games so that the user can have a more interactive experience in a virtual environment. As opposed to other types of display devices, an HMD is worn directly over a user's head. The HMD may directly interface with a user's face while exerting pressure onto the user's head due to its weight. Hence, a strap system is used in the HMD to secure the HMD securely to the user's head in a comfortable manner.

Audio systems for HMDs are also subject to constraints often not encountered in other devices. Ear buds or ear phones of HMDs impose inconvenience because of lines to transmit signals to the ear buds or ear phones. Moreover, when the HMDs are used by multiple users, sharing of ear buds or ear phones may cause hygiene issues.

SUMMARY

Embodiments relate to a head-mounted display (HMD) including a strap arm that transmits audio. The HMD includes a front rigid body, and the strap arm attached to a strap that secures the front rigid body to a user's head. The strap arm includes a body portion and a speaker. The body portion defines a boss at a side of the body portion. The boss includes an aperture, and rotatably connects the strap arm to the front rigid body. The body portion further defines an audio passage to transmit sound and an audio port to output the sound. The audio passage being is along the body portion between the aperture of the boss and the audio port. The speaker is positioned, such as within the aperture, to emit the sound through the audio passage and to the audio port.

In some embodiments, the strap arm further includes a back volume unit. The back volume unit includes an enclosure portion and a cylindrical column. The cylindrical column is inserted through the aperture of the boss. The cylindrical column defines a second aperture. The speaker is positioned within the second aperture with a back side of the speaker facing an interior surface of the enclosure portion to define a back volume between the interior surface and the back side of the speaker for enhancing the sound emitted by the speaker. At least a portion of the sound from the speaker is transmitted from the back volume through the audio passage.

Some embodiments include a strap arm for a head-mounted display (HMD). The trap arm includes a body portion and a speaker. The body portion defines a boss at a side of the body portion, the boss having an aperture, and the boss rotatably connecting the strap arm to a front rigid body of the HMD. The body portion further defines an audio passage to transmit sound and an audio port to output the sound. The audio passage is defined along the body portion between the aperture of the boss and the audio port. The speaker is positioned, such as within the aperture, to emit the sound through the audio passage and to the audio port.

Some embodiments include an HMD including a housing and a strap arm. The strap arm is attached to a strap that secures the housing to a user's head. The strap arm includes a body portion defining a boss at a side of the body portion. The boss has an aperture, and the boss rotatably connects the strap arm to the housing. The body portion further defines an audio passage to transmit sound from the aperture and an audio port to output the sound. The audio passage is defined along the body portion between the aperture of the boss and the audio port.

BRIEF DESCRIPTION OF THE DRAWINGS

The teachings of the embodiments can be readily understood by considering the following detailed description in conjunction with the accompanying drawings.

FIG. 5A is front view of a base portion of the strap arm, in accordance with an embodiment.

FIG. 5B is a perspective view of the base portion of the strap arm, in accordance with an embodiment.

The figures depict various embodiments for purposes of illustration only.

DETAILED DESCRIPTION

In the following description of embodiments, numerous specific details are set forth in order to provide more thorough understanding. However, note that the embodiments may be practiced without one or more of these specific details. In other instances, well-known features have not been described in detail to avoid unnecessarily complicating the description.

Embodiments are described herein with reference to the figures where like reference numbers indicate identical or functionally similar elements. Also in the figures, the left most digits of each reference number corresponds to the figure in which the reference number is first used.

Embodiments relate to a strap system with a strap arm that incorporates audio passages and an audio port for delivering sound generated by a HMD to a user's ear. The strap arm has a cylindrical boss that couples the strap arm to a back volume unit of the HMD in a rotatable manner. The strap arm has loops for fastening head straps and is formed with audio passages that deliver sound generated from a speaker in the back volume unit. The strap arm performs the function of securing the head straps and transmitting sound generated from the HMD to the user's ear.

Figure 1:
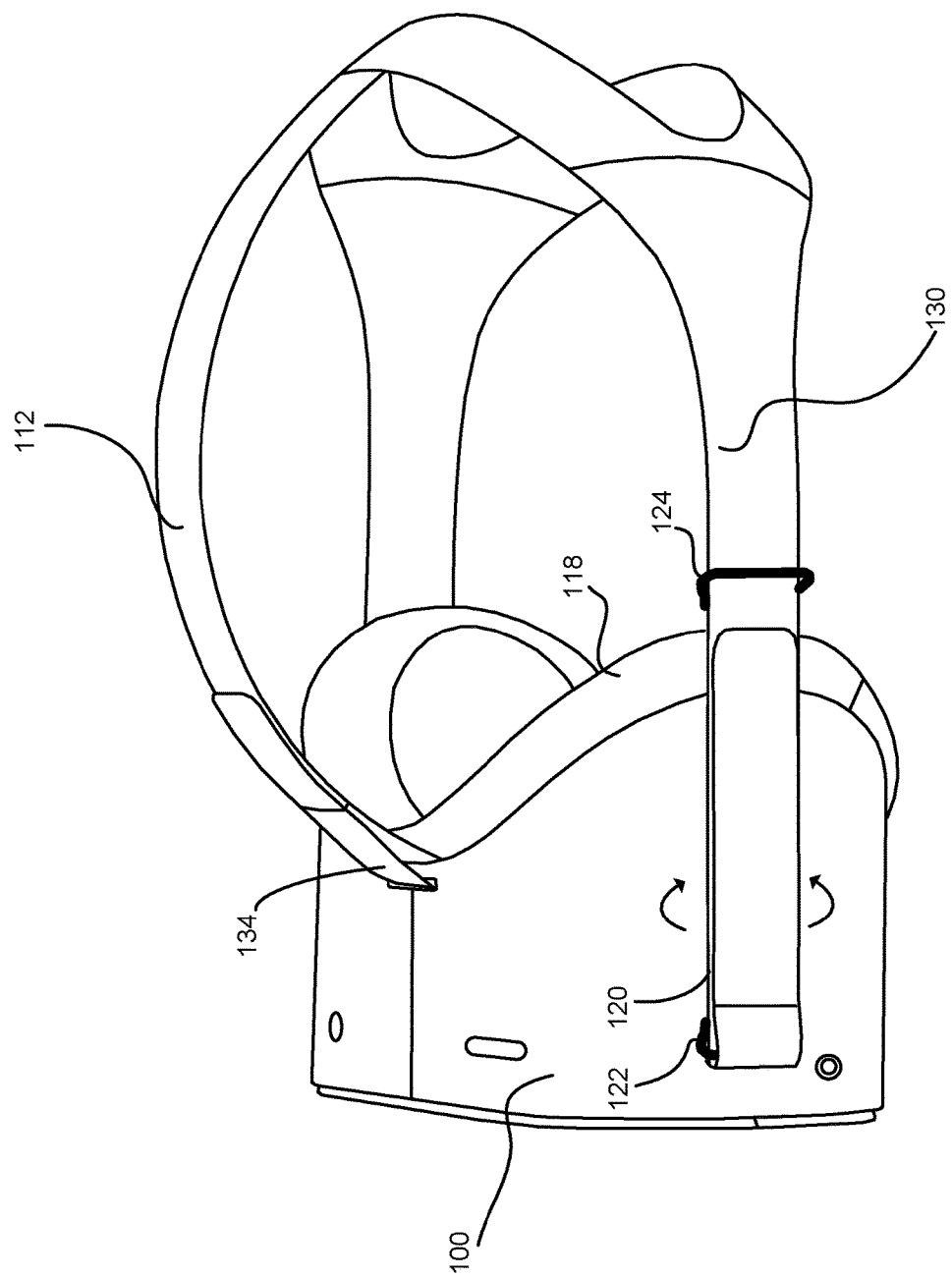
FIG. 1 is an example perspective view of a HMD attached with a strap system, in accordance with an embodiment.

FIG. 1 is an example perspective view of a HMD attached with a strap system, in accordance with an embodiment. The HMD includes, among other components, a front rigid body 100 (or "body 100") and a facial interface 118 attached to the body 100. The body 100 includes various components such as a display panel, optical elements and circuits (not shown). The facial interface 118 is made of a material softer than the body 100 and comes into contact with a user's face when the HMD is worn by the user. In some embodiments, the HMD includes a different type of housing than the body 100.

The body 100 is attached with a strap 130 at both sides (i.e., the left side and the right side). As shown in FIG. 1, the left portion of the strap 130 (or "left strap 130") is fixed to a front loop 122 and a rear loop 124 of a left strap arm 120. The left strap arm 120 is fixed in a rotatable manner to the body 100 in directions as shown by arrows. In order to fix the strap 130 to the strap arm 120, the left strap 130 is first inserted through loops 124, then through loop 122, and then folded back onto itself as shown in FIG. 1. The overlapping of the left strap 130 can be adjusted to control the length of the left strap 130. The back side of the left strap 130 and the front side of the left strap 130 has Velcro attached, and hence, the end of the strap 130 is securely fixed once the user presses the back side of the left strap 130 onto the front side of the left strap 130. Other types of adjustable mechanical attachment between a strap and strap arm may also be used, such as a buckle attachment. By controlling the length of the left and right straps as well as the tilting angle of the HMD, the user can comfortably wear the HMD.

The right portion of the strap 130 (or "right strap") is attached to the right side of the HMD using a right strap arm (not shown) in the same way.

An aperture 134 is formed in the body 100 to receive an end of a center bridge 112 of the strap 130. The end of the center bridge 112 is inserted below an edge of the body 100 and extends through the aperture 134. The end of the center bridge 112 extending from the aperture 134 folds back onto another portion of the center bridge 112 and overlaps with the other portion of the center bridge 112 to secure the center bridge 112 to the body 100. The center bridge 112 may include Velcro (or some other type of attachment) on the upper surface and lower surface of the center bridge 112 so that the end portion of the center bridge 112 is secured onto the other portion of the center bridge 112 when pressed against the other portion of the center bridge 112. The user may adjust the length of the center bridge 112 by detaching the end portion of the center bridge 112 from the other portion of the center bridge 112 and changing the location of the center bridge 112 where the end portion of the center bridge 112 is attached. By adjusting the length of the center bridge 112, the user can adjust the orientation of the strap arm 120 with respect to the body 100 to direct sound through the strap arm 120 to the user's ear.

Figure 2:
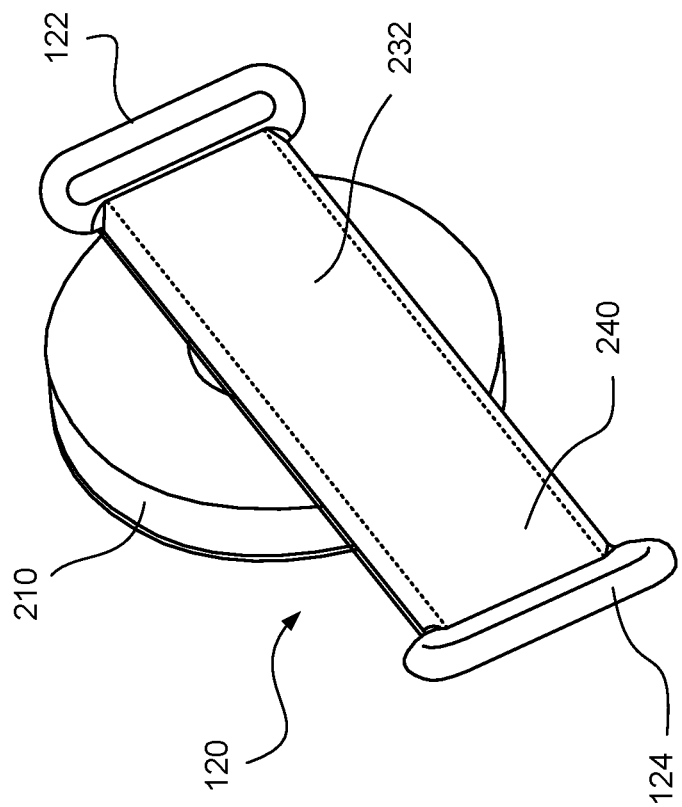
FIGS. 2 through 4 are perspective views of a strap arm of a HMD, in accordance with an embodiment.
Figure 4:
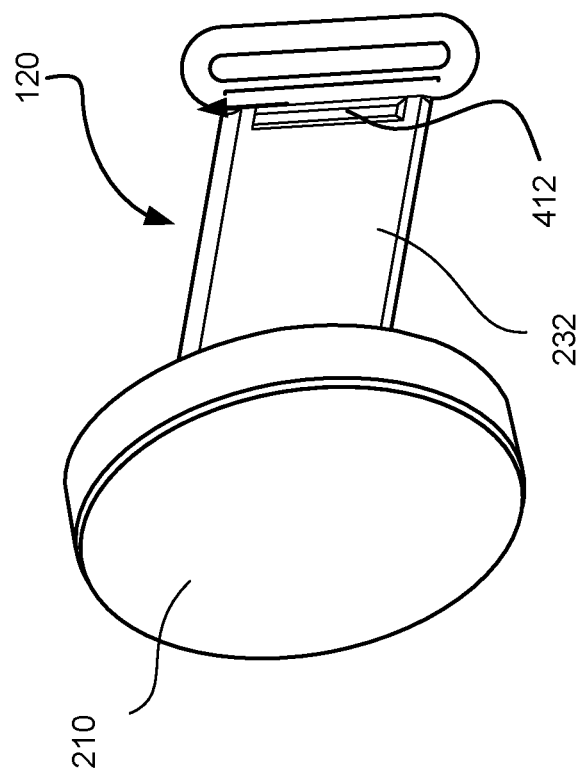
Figure 3:
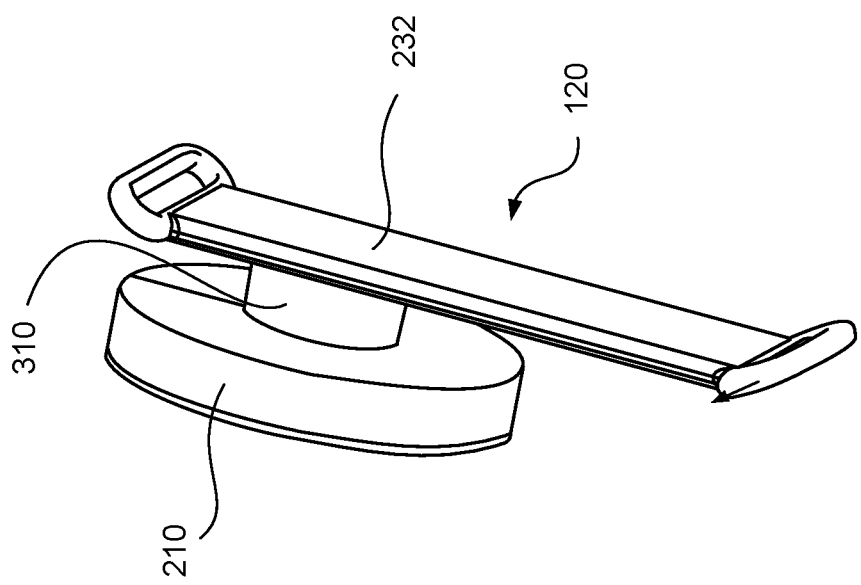
Figure 6:
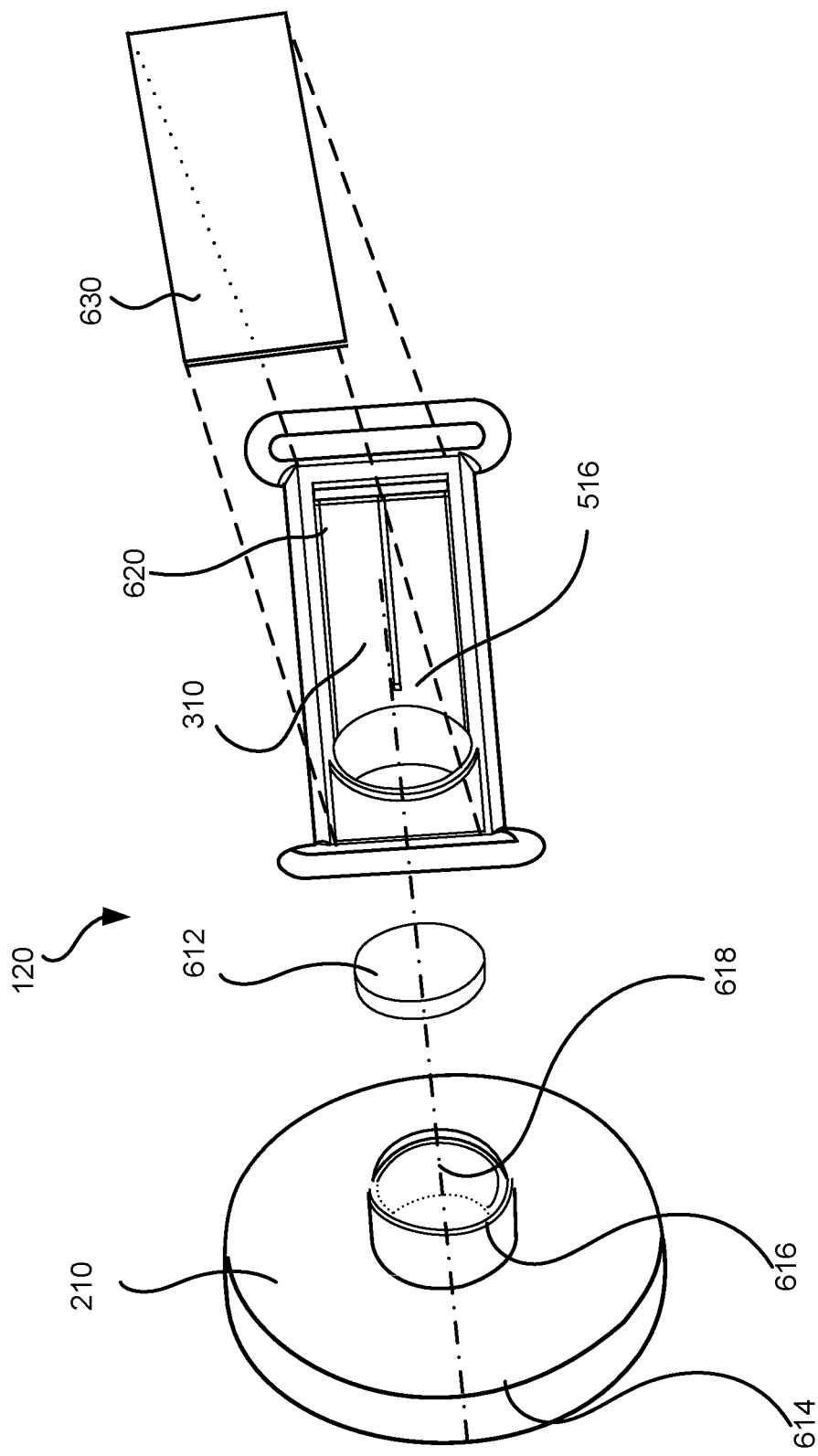
FIG. 6 is an exploded perspective view of the strap arm, in accordance with an embodiment.
Figure 7:
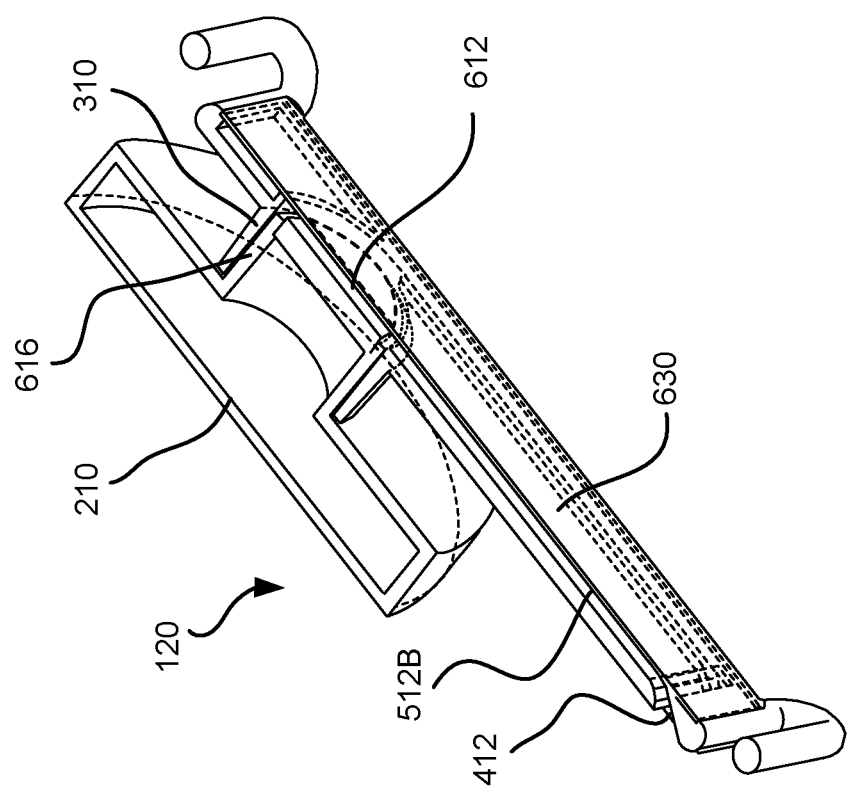
FIG. 7 is a cross-sectional view of the strap arm, in accordance with an embodiment.

FIGS. 2 through 4 are perspective views of the strap arm 120 of a HMD, in accordance with an embodiment. The strap arm 120 has a body portion 232 defined between the front loop 122 and the rear loop 124, a back volume unit 210, and a speaker 612. The speaker 612 is positioned within the body portion 232 and/or back volume unit 210, as shown in FIGS. 6 and 7. The body portion 232 includes a support surface 240 that supports a portion of the strap 130 inserted through the loops 122, 124 and the portion of the strap 130 folded backwards from loop 122. The support surface 240 functions as surface onto which the folded back portion of the strap 130 and the portion of the strap 130 extending between the loops 122, 124 can be pressed by the use to secure the folded back portion onto the portion of the strap 130 between the loops 122, 124.

The back volume unit 210 includes an enclosure portion 614 and a cylindrical column 616 that protrudes from the enclosure portion 614 (e.g., as shown in FIG. 6). The enclosure portion 614 that provides a cavity from which the sound generated from a speaker 612 can be reverberated towards audio passages 512A, 512B (e.g., as shown in FIG. 5A) of the strap arm 120. The back volume unit 210 enhances the quality and/or volume of the sound provided to the user via the audio port 412. In some embodiments, the enclosure portion 614 has a cylindrical shape defining a diameter than is larger than a diameter defined by the cylindrical column.

The strap arm 120 includes a cylindrical boss 310 that is received in an aperture formed at a side of the body 100 of the HMD. The strap arm 120 can rotate relative to the body 100 about the center of the boss 310. The cylindrical boss 310 of the strap arm 120 defines an aperture 516 that holds the cylindrical column 616 of the back volume unit 210.

The speaker 612 is positioned to emit sound through the audio passages 512A, 512B and to the audio port 412. In some embodiments, the speaker 612 is inserted into the cylindrical column 616, as shown in FIG. 7. In particular, the speaker 612 is positioned within an aperture 618 defined by the cylindrical column 616 of the back volume unit 210, with the cylindrical column 616 being positioned within the aperture 516 defined by the boss 310. The speaker 612 is positioned within the aperture 618 with a back side of the speaker 612 facing an interior surface of the enclosure portion 614 to define a back volume between the interior surface and the back side of the speaker 612 for enhancing the sound emitted from the speaker. At least a portion of the sound from the speaker 612 is transmitted from the back volume through the audio passages 512A, 512B, and output at the audio port 412. The front side of the speaker 612 faces a volume within the strap arm 120 defined by the audio passages 512A and 512B.

The cylindrical boss 310 extends through an aperture of the body 100 to attach the strap arm 120 to the body 100. The enclosure portion 614 of the back volume unit 210 is positioned on a first side of the aperture of the body 100 within the body 100, and the body portion 232 of the strap arm 120 (including audio passages 512A, 512B and the audio port 412) is positioned on a second side of the aperture of the body 100 exterior to the body 100.

The body portion 232 of the strap arm 120 may include a base portion 620 and a cover portion 630. FIG. 5A is a front view of the base portion 620 of the strap arm 120. The base portion 620 includes loops 122, 124 and has a body portion 232 with the audio passages 512A, 512B that extend along the body portion 232 from the aperture 516 of the boss 310 to the audio port 412. The audio passages 512A, 512B are separated by a center rib 522. In some embodiments, the audio passages 512A, 512B are defined by recesses within the base portion 620 separated by a protrusion defining the center rib 522. When the base portion 620 and the cover portion 630 are joined, the recesses within the base portion 620 between the center rib 522 results in the audio passages 512A, 512B being defined between the base portion 620 and the cover portion 630.

The sound generated by the speaker 612 travels through the audio passages 512A, 512B to the audio port 412. Furthermore, some or all of the sound generated by speaker 612 may be enhanced by the back volume unit 210, and then directed by the trap arm 120 through the audio passages 512A, 512B to the audio port 412. The audio port 412 is placed and oriented so that that the sound from the audio port 412 is forwarded or directed toward a user's ear when the user wears the HMD. The body portion 232 of the base portion 620 is covered by the cover portion 630, as shown in FIG. 6.

FIG. 5B is a perspective view of the base portion 620 of the strap arm 120, in accordance with an embodiment. The audio port 412 and the boss 310 are formed on the same side of the body portion 232 to direct sound toward the user's ear. When the HMD is worn by the user, the audio port 412 can be positioned close to the user's ear. The audio port 412 is a carved out section of the strap arm 120 that is connected to the audio passages 512A, 512B to transmit the sound in a backward direction (e.g., from the perspective of the user) to the user's ear.

FIG. 6 is an exploded perspective view of the strap arm 120, in accordance with an embodiment. The speaker 612 is inserted into the cylindrical column 616, as discussed above. Signal lines (not shown) of the speaker 612 may extend from an audio circuit in the HMD via the back volume unit 210 or through a gap between the cylindrical column 616 and the boss 310. In some embodiments, the back volume unit 210 is formed from two separate clamshell portions that are joined to form a sealed cavity for the back volume. The signal lines (e.g., wires) extend between the interface of the joined portions, with the interface and wires forming a seal to maintain the sealed cavity for the back volume.

The cylindrical column 616 of the back volume unit 210 is inserted into the aperture 516 of the boss 310 with the speaker 612 mounted in the aperture 618 of the cylindrical column 616. The cover portion 630 is placed onto the base portion 620 to enclose the audio passages 512A, 512B to transmit the sound to generated by the speaker 612 to the audio port 412.

FIG. 7 is a cross-sectional view of the strap arm 120 in an assembled state, in accordance with an embodiment. The speaker 612 is mounted in the cylindrical column 616 and has its front side facing towards the audio passages 512A, 512B. As shown in FIG. 7, a front side (or membrane) of the speaker 612 is generally aligned in parallel to a rear interior surface portion of the back volume unit 210 and the body portion 232.

In various embodiments, the speaker 612 can be positioned in different locations of the strap arm 120. For example, the speaker 612 can be attached to the cylindrical column 616 of the back volume unit 210 as shown in FIG. 7. In yet another example, the speaker 612 is positioned within the enclosure portion 614 of the back volume unit 210. Here, the size of the speaker 612 can be larger than the aperture 516 defined by the boss 310. These embodiments allows the body portion 232 of the strap arm to be separated from the body 100 of the HMD without removing the speaker 612, and thus the body portion 232 of the strap arm 120 is more readily detachable (e.g., for replacement).

In other embodiments, the speaker 612 is attached to body portion 232 of the strap arm 120 exterior to the body 100. For example, the speaker 612 may be attached to the cylindrical boss 310 of the body portion 232 of the strap arm 120. In another example, the speaker 612 is attached to the cover portion 630 instead of the base portion 620. Whether the speaker 612 is attached to the base portion 620 or cover portion 630, the speaker 612 may be positioned in various locations such as within the aperture 516, or away from the aperture 516 and closer to the audio port 412.

The foregoing description of the embodiments has been presented for the purpose of illustration; it is not intended to be exhaustive or to limit the embodiments to the precise forms disclosed. Persons skilled in the relevant art can appreciate that many modifications and variations are possible in light of the above disclosure.

Finally, the language used in the specification has been principally selected for readability and instructional purposes, and it may not have been selected to delineate or circumscribe the inventive subject matter. It is therefore intended that the scope be limited not by this detailed description, but rather by any claims that issue on an application based hereon. Accordingly, the disclosure of the embodiments is intended to be illustrative, but not limiting, of the scope, which is set forth in the following claims.

What is claimed is:

1. A head-mounted display (HMD), comprising:
    a front rigid body;
    a strap arm attached to a strap that secures the front rigid body to a user's head, the strap arm including:
        a body portion defining a boss at a side of the body portion, the boss having an aperture, the boss rotatably connecting the strap arm to the front rigid body, the body portion further defining an audio passage to transmit sound from the aperture and an audio port to output the sound, the audio passage being defined along the body portion between the aperture of the boss and the audio port; and
        a speaker positioned to emit the sound through the audio passage and to the audio port.

2. The HMD of claim 1, wherein the strap arm further includes a back volume unit including:
    an enclosure portion; and
    a cylindrical column inserted through the aperture of the boss, the cylindrical column defining a second aperture, the speaker being positioned within the second aperture with a back side of the speaker facing an interior surface of the enclosure portion to define a back volume between the interior surface and the back side of the speaker for enhancing the sound emitted from the speaker, at least a portion of the sound from the speaker being transmitted from the back volume through the audio passage.

3. The HMD of claim 2, wherein the speaker is positioned within the aperture of the boss of the body portion and the front side of the speaker faces toward the audio passage.

4. The HMD of claim 2, wherein:
    the boss extends through a second aperture of the front rigid body to rotatably connect the strap arm to the front rigid body; and
    the enclosure portion is positioned on a first side of the second aperture within the front rigid body and the body portion of the strap arm is positioned on a second side of the second aperture exterior to the front rigid body.

5. The HMD of claim 1, wherein the strap arm further includes:
    a rear loop at one end of the body portion; and
    a front loop at the other end of the body portion, the rear loop and the front loop receiving the strap.

6. The HMD of claim 5, wherein the body portion includes a support surface facing the strap inserted through the front loop and the rear loop.

7. The HMD of claim 5, wherein the audio port is formed on the side of the body portion including the boss and at a location closer to the rear loop than the front loop.

8. The HMD of claim 1, wherein the body portion includes:
a base portion; and
a cover portion secured to the base portion, the audio passage being defined between the base portion and the cover portion.

9. The HMD of claim 1, wherein the body portion further defines:
a second audio passage; and
a center rib separating the audio passage and the second audio passage.

10. The HMD of claim 1, wherein the front rigid body defines a second aperture to receive a center bridge of the strap.

11. A strap arm for a head-mounted display (HMD), comprising:
a body portion defining a boss at a side of the body portion, the boss having an aperture, the boss rotatably connecting the strap arm to a front rigid body of the HMD, the body portion further defining an audio passage to transmit sound from the aperture and an audio port to output the sound, the audio passage being defined along the body portion between the aperture of the boss and the audio port; and
a speaker positioned to emit the sound through the audio passage and to the audio port.

12. The strap arm of claim 11, further comprising a back volume unit including:
an enclosure portion; and
a cylindrical column inserted through the aperture of the boss, the cylindrical column defining a second aperture, the speaker being positioned within the second aperture with a back side of the speaker facing an interior surface of the enclosure portion to define a back volume between the interior surface and the back side of the speaker for enhancing the emitted from by the speaker, at least a portion of the sound from the speaker being transmitted from the back volume through the audio passage.

13. The strap arm of claim 12, wherein the speaker is positioned within the aperture of the boss of the body portion and the front side of the speaker faces toward the audio passage.

14. The strap arm of claim 12, wherein:
the boss extends through a second aperture of the front rigid body to rotatably connect the strap arm to the front rigid body; and
the enclosure portion is positioned on a first side of the second aperture within the front rigid body and the body portion of the strap arm is positioned on a second side of the second aperture exterior to the front rigid body.

15. The strap arm of claim 11, further including:
a rear loop at one end of the body portion; and
a front loop at the other end of the body portion, the rear loop and the front loop receiving the strap.

16. The strap arm of claim 15, wherein the body portion includes a support surface facing the strap inserted through the front loop and the rear loop.

17. The strap arm of claim 15, wherein the audio port is formed on the side of the body portion including the boss and at a location closer to the rear loop than the front loop.

18. The strap arm of claim 11, wherein the body portion includes:
a base portion; and
a cover portion secured to the base portion, the audio passage being defined between the base portion and the cover portion.

19. The strap arm of claim 11, wherein the body portion further defines:
a second audio passage; and
a center rib separating the audio passage and the second audio passage.

20. A head-mounted display (HMD), comprising:
a housing; and
a strap arm attached to a strap that secures the housing to a user's head, the strap arm including a body portion defining a boss at a side of the body portion, the boss having an aperture, the boss rotatably connecting the strap arm to the housing, the body portion further defining an audio passage to transmit sound from the aperture and an audio port to output the sound, the audio passage being defined along the body portion between the aperture of the boss and the audio port.

* * * * *

UNITED STATES PATENT AND TRADEMARK OFFICE
CERTIFICATE OF CORRECTION

PATENT NO. : 10,194,225 B2
APPLICATION NO. : 15/680086
DATED : January 29, 2019
INVENTOR(S) : Peter Wesley Bristol et al.

Page 1 of 1

It is certified that error appears in the above-identified patent and that said Letters Patent is hereby corrected as shown below:

In the Claims

Column 7, Line 35, Claim 12, Line 10, delete "enhancing the emitted from by the speaker" insert -- enhancing the sound emitted from the speaker --

Signed and Sealed this
Eleventh Day of June, 2019

Andrei Iancu
*Director of the United States Patent and Trademark Office*